(12) United States Patent
Choi et al.

(10) Patent No.: US 7,512,190 B2
(45) Date of Patent: Mar. 31, 2009

(54) DATA TRANSMISSION APPARATUS USING ASYNCHRONOUS DUAL-RAIL BUS AND METHOD THEREFOR

(75) Inventors: Byung-Soo Choi, Gwangju (KR); Dong-Soo Har, Gwangju (KR)

(73) Assignee: Gwangju Institute of Science and Technology, Department of Information and Communications (GIST) (KR)

( * ) Notice: Subject to any disclaimer, the term of this patent is extended or adjusted under 35 U.S.C. 154(b) by 905 days.

(21) Appl. No.: 10/938,391

(22) Filed: Sep. 9, 2004

(65) Prior Publication Data

US 2005/0180514 A1 Aug. 18, 2005

(30) Foreign Application Priority Data

Feb. 18, 2004 (KR) ...................... 10-2004-0010699

(51) Int. Cl.
*H04L 27/00* (2006.01)
*H04L 12/26* (2006.01)

(52) U.S. Cl. ...................... 375/295; 375/316; 375/354; 370/229

(58) Field of Classification Search ................. 375/295, 375/316, 354; 370/229–240
See application file for complete search history.

(56) References Cited

U.S. PATENT DOCUMENTS

| | | | | | |
|---|---|---|---|---|---|
| 6,128,678 | A | * | 10/2000 | Masteller | 710/52 |
| 6,152,613 | A | * | 11/2000 | Martin et al. | 712/33 |
| 6,625,163 | B1 | * | 9/2003 | Shideler et al. | 370/445 |
| 6,798,744 | B1 | * | 9/2004 | Loewen et al. | 370/235 |
| 7,298,762 | B2 | * | 11/2007 | Rakib | 370/468 |
| 2003/0163627 | A1 | * | 8/2003 | Deng et al. | 710/305 |
| 2003/0196030 | A1 | * | 10/2003 | Elliott et al. | 711/104 |
| 2003/0237056 | A1 | * | 12/2003 | Schoenfeld et al. | 716/1 |
| 2004/0078608 | A1 | * | 4/2004 | Kanapathippillai et al. | 713/300 |
| 2004/0114698 | A1 | * | 6/2004 | Barrett et al. | 375/355 |

\* cited by examiner

*Primary Examiner*—Chieh M Fan
*Assistant Examiner*—Jason M. Perilla
(74) *Attorney, Agent, or Firm*—Sheridan Ross P.C.

(57) ABSTRACT

The present invention relates to a data transmission apparatus using an asynchronous dual-rail bus and a method therefor which can reduce power consumption for transferring data by limiting the number of dual-rail buses transferring data when a transmission side transfers an identical data.

12 Claims, 5 Drawing Sheets

DATA TRANSMISSION APPARATUS USING ASYNCHRONOUS DUAL-RAIL BUS AND METHOD THEREFOR

FIELD OF THE INVENTION

This present invention relates to a data transmission apparatus using an asynchronous dual-rail bus and a method therefor, and more particularly to, a data transmission apparatus using an asynchronous dual-rail bus and a method therefor capable of reducing power consumption for a data transmission by limiting the number of dual-rail bus lines transferring data when a transmission side transfers an identical data repeatedly.

DESCRIPTION OF THE RELATED ART

Since a system performing a data communication gets more multi-functions and high-capacity, it has been more complicated to construct a bus. The more the bus is constructed with complexity, the more the system causes data transmission error. And, the data transmission error results from difficult synchronization between data and a control signal.

Accordingly, in order to solve the problem, it has been studied for a method of a data transmission using a dual-rail data representation technique. In general, a bus using the dual-rail data representation technique is called as an asynchronous dual-rail bus.

The asynchronous dual-rail bus on the basis of the dual-rail data representation technique has a structure physically using signal lines twice more than a synchronous single-rail bus of the conventional art does. That is, the asynchronous dual-rail bus physically uses two signal lines in order to represent one logical bit.

FIG. 1 is a timing diagram illustrating a signal transition state of both the synchronous single-rail bus and the asynchronous dual-rail bus when transferring an identical data.

FIG. 1 assumes that data to be transferred is logically transmitted in order of "010".

In the case, the synchronous single-rail bus confirms a level of a signal line D at a signal transition timing of a clock as a logical value. That is, the signal line D at a rising timing of a first clock has a logical "0" level, and in response to this, a corresponding signal for the level is transferred to the synchronous single-rail bus. Furthermore, the signal line D at a rising timing of a second clock has a logical "1" level, and in response to this, a corresponding signal for the level is transferred to the synchronous single-rail bus.

Conversely, the asynchronous dual-rail bus uses a pair of signal lines, namely, two physical signal lines D0, D1 in order to represent a logical bit. That is, if the signal line D0 has a value for "1" and the signal line D1 has a value for "0", the pair of signal lines D0, D1 is considered as having a logical value for "0". On the other side, if the signal line D0 has a value for "0" and the signal line D1 has a value for "1", the pair of the signal lines D0, D1 is considered as having a logical value for "1".

The aforementioned asynchronous dual-rail bus proposed to solve the data transmission error causes a number of signal transitions when an identical data is repeatedly transferred, which result in a number of switching operation. As a result, the asynchronous dual-rail bus consumes excessive power.

In detail, referring to FIG. 2, if a same logical data "3" is periodically transferred in the asynchronous dual-rail bus, each signal line transfers a logical "3" during a first period in FIG. 2, and then transfers the same logical "3" data during second and third periods.

As aforementioned, when an identical data is repeatedly transferred, the asynchronous dual-rail bus generates a signal transition as shown in FIG. 2 for every signal lines. The signal transition, as described above, causes the switching operation. As a result, power consumption increases.

SUMMARY OF THE INVENTION

To solve the aforementioned problems in the conventional asynchronous dual-rail bus, an object of the present invention is to provide an asynchronous dual-rail bus for reducing power consumption for data transmission when a transmission side transfers an identical data repeatedly, as solution for the problem of using a signal transition wastefully in the conventional asynchronous dual-rail bus.

In order to achieve the above-described object of the invention, there is provided a data transmission apparatus using asynchronous dual-rail bus which limits the number of asynchronous dual-rail buses for transferring data under a predetermined number when the identical data is repeatedly transferred, including: a compressor constructed on the transmission side of the asynchronous dual-rail bus for outputting a corresponding index signal and index control signal when the identical data is repeatedly transferred by including a transmission data control unit for storing a previously-transmitted data, and comparing the previously-transmitted data with a currently-transmitted data; and de-compressor constructed in the receiving side of the asynchronous dual-rail bus including output data control unit for storing the previously-transmitted data, and outputting the previously-transmitted data stored in an output data control unit when the index signal and the index control signal are transferred in the case that the identical data is repeatedly transferred.

Here, the index signal outputted from the transmission data control unit is transferred to the output data control unit through a predetermined number of bus lines among the asynchronous dual-rail bus lines.

As a method of transferring data in a data transmission apparatus using an asynchronous dual-rail bus comprising; a compressor constructed in the transmission side of asynchronous dual-rail bus including a transmission data control unit storing the previously-transmitted data; and a de-compressor constructed in the receiving side for receiving data including an output data control unit for storing the previously-transmitted data, a data transmission procedures in the compressor is achieved by including: a first step for storing a currently-transmitted data and comparing it with the previously-transmitted data by way of the transmission data control unit; a second step for generating corresponding index signal and index control signal when the previously-transmitted data and the currently-transmitted data are decided to be identical each other according to the comparison result by way of the transmission data control unit; a third step for filtering the currently-transmitted data transferred through the asynchronous dual-rail bus in response to the generated index control signal; and a fourth step for transferring the index signal and the index control signal to the de-compressor, and a data transmission procedures in the de-compressor is achieved by including: a fifth step for storing the currently-transmitted data by way of the output data control unit, and outputting the previously-transmitted data stored in the output data control unit with reference to the index signal if the index control signal corresponding to a repeated transmission of the identical data is received; a sixth step for filtering the succeeding transfer of the index signal by the index control signal; and a seventh step for combining an output data from the output data control unit and data transferred from the compressor and then outputting the combined data.

In a data transmission apparatus using the asynchronous dual-rail bus in accordance with the present invention, if a data different from the previously-transmitted data is transferred in sequence, every dual-rail bus is used, and if a data same as the previously-transmitted data is transferred in sequence, the index signal is transferred through only a few limited lines.

DETAILED DESCRIPTION OF PREFERRED EMBODIMENTS

The aforementioned object, technical configuration, and an operational effect thereby of a data transmission apparatus in accordance with the present invention will now be described in detail with reference to the accompanying drawings.

Figure 1:
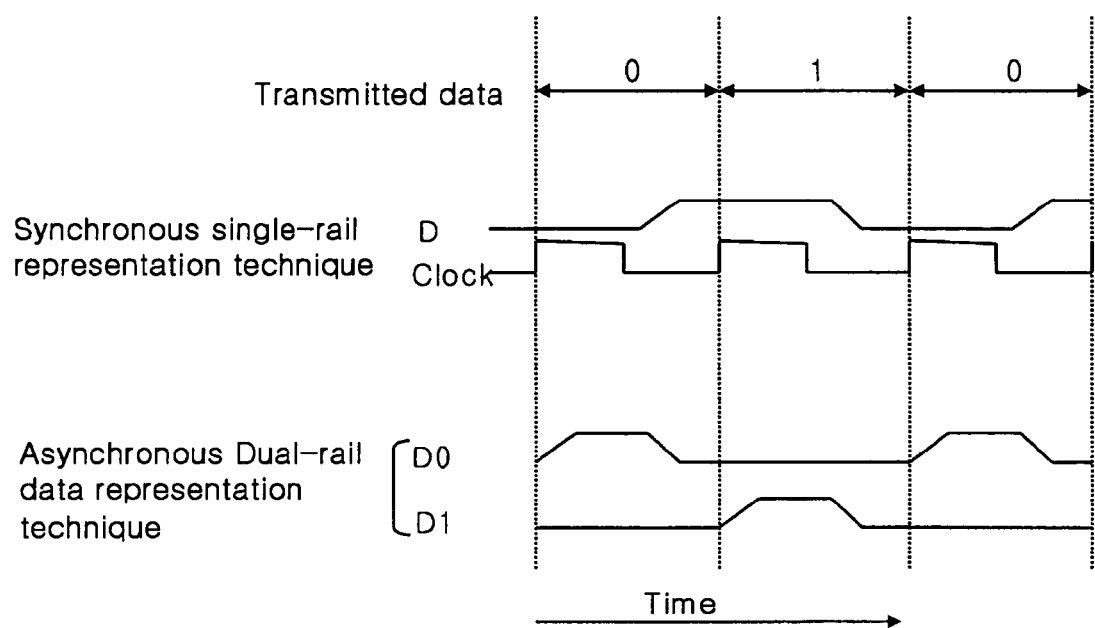
FIG. 1 is a timing diagram illustrating a conventional transmission data representation technique.
Figure 2:
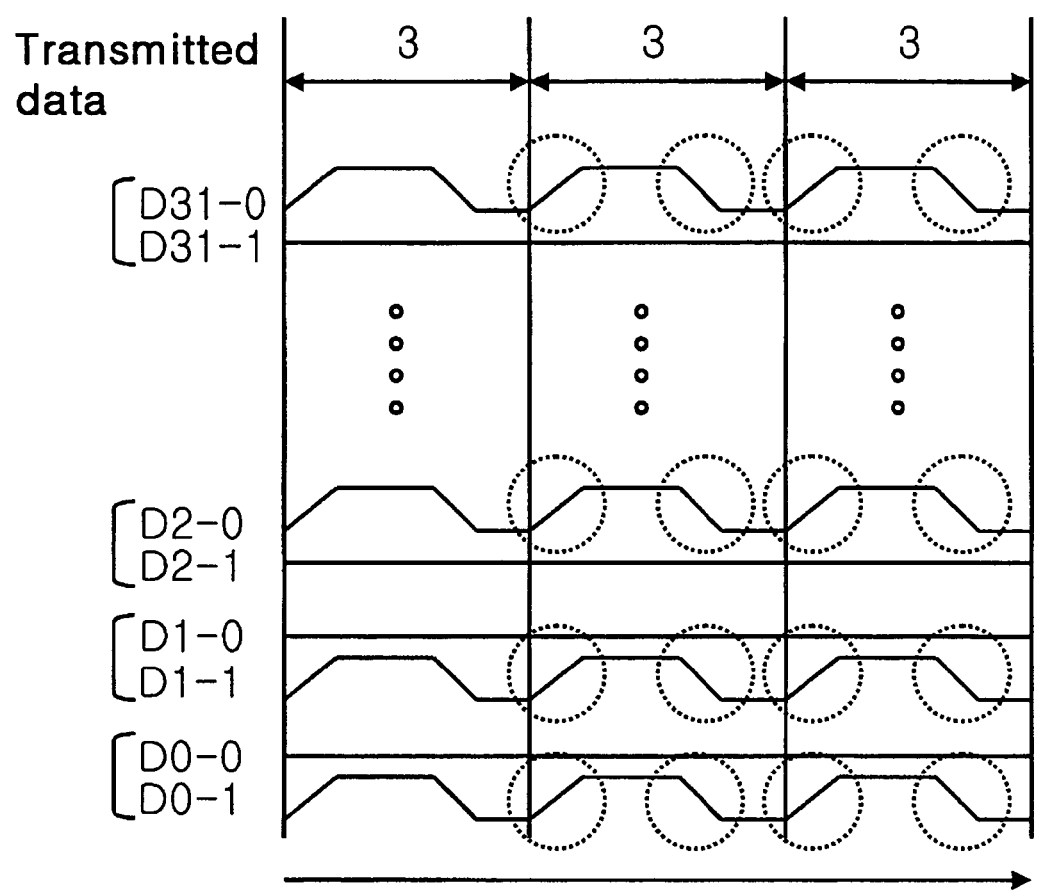
FIG. 2 is a timing diagram illustrating a signal transition state in the case that an identical data is repeatedly transferred by a data transmission apparatus using a conventional asynchronous dual-rail bus.
Figure 3:
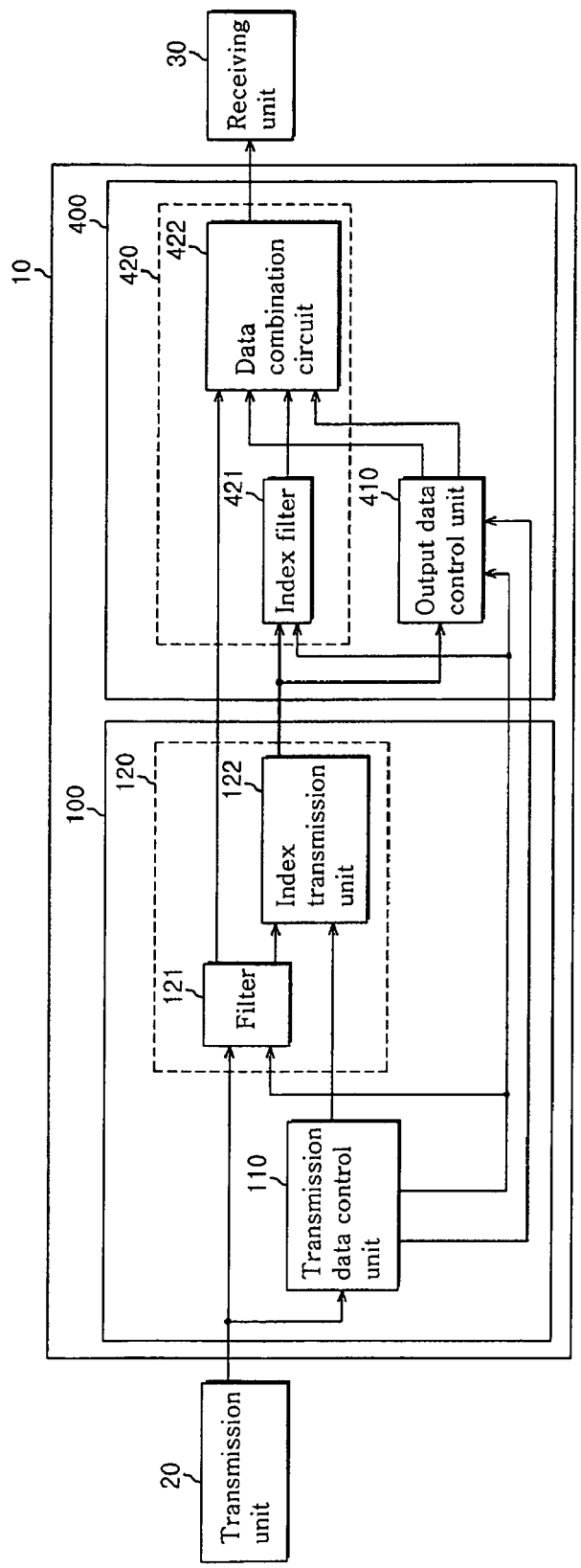
FIG. 3 is a block diagram illustrating a data transmission apparatus using an asynchronous dual-bus in accordance with an embodiment of the present invention.

FIG. 3 is a block diagram illustrating a data transmission apparatus using an asynchronous dual-rail bus in accordance with an embodiment of the present invention.

As described in FIG. 3, a data transmission apparatus using an asynchronous dual-rail bus of the present invention is comprised of a transmission unit 20, a receiving unit 30, and a data transceiving unit 10 between the transmission unit 20 and the receiving unit 30. Here, an asynchronous dual-rail bus is comprised between the transmission unit 20 and the receiving unit 30 in order to transfer a plural bits of data, and the data transceiving unit 10 is comprised on the way that the dual-rail bus is comprised.

The data transceiving unit 10 is comprised of a compressor 100 for performing an encoding operation and a de-compressor 400 for performing a decoding operation.

The compressor 100 includes a transmission data control unit 110 and a control circuit 120 for checking out identity between a current data and a previous data and performing an encoding operation deciding data to be transferred.

The transmission data control unit 110 includes a buffer (not shown) for storing the previously-transmitted data, and after comparing the previously-transmitted data stored in the buffer and the currently-transmitted data, an index signal and an index control signals MISS, HIT are outputted according to the comparison result.

The control circuit 120 is comprised of a filter 121 and an index transmission unit 122.

The filter 121 for filtering a signal transferred through a dual-rail bus blocks data from being transferred in every dual-rail bus when an identical data is repeatedly transferred.

Moreover, the index transmission unit 122 transfers data transferred through the dual-rail bus and an index signal transferred from the transmission data control unit 110. When the identical data is transferred, there is no data transferred from the dual-rail bus. As a result of this, the index transmission unit 122 transfers the index signal transferred from the transmission data control unit 110.

Then, the de-compressor 400 performs a decoding operation generating the last transmission data by using the data from the compressor 100, and the de-compressor 400 is comprised of an output data control unit 410 and a control circuit 420.

The output data control unit 410 is comprised of a buffer (not shown) storing the previously-transmitted data, and outputs or controls the corresponding data stored in the buffer according to the index control signals MISS, HIT.

The control circuit 420 is comprised of an index filter 421 and a data combining circuit 422. The index filter 421 removes the corresponding index information when the index signal is transferred from the compressor 100. The data combining circuit 422 combines a data value from a data bus and a data value from the output data control unit 410.

As aforementioned, the compressor 100 and the de-compressor 400 are comprised of the transmission data control unit 110 and the output data control unit 410 including the buffer, respectively, and thus operate to transfer an index data or a normal data by classifying a repeated transmission of the identical data or a transmission of a different data. Here, the index control signal is generated in the compressor 100 and then transferred to the de-compressor 400 to control the transmission condition.

Figure 4:
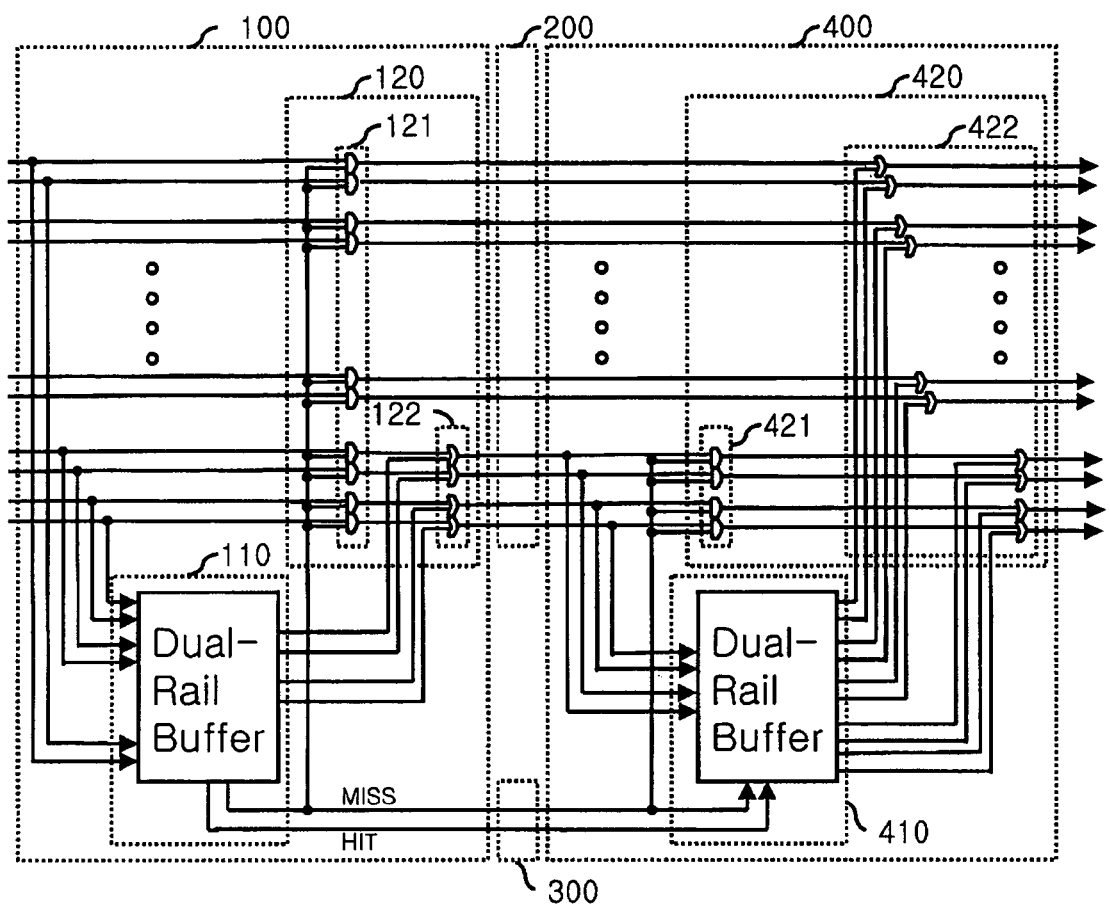
FIG. 4 is a detailed circuit diagram illustrating a data transceiving unit of FIG. 3.

The data transceiving unit 10 in accordance with the present invention constructed such as FIG. 3 is formed of a detailed circuit such as FIG. 4, and it will be described about a block diagram in FIG. 3 with reference to FIG. 4 in detail as follows.

As described, the compressor 100 performing an encoding operation is comprised of a transmission data control unit 110 and a control circuit 120, and the control unit 120 is comprised of a filter 121 and an index transmission unit 122.

A dual-rail bus passing through the compressor 100 is branched off and then connected with the transmission data control unit 110 to input data to transfer. The data control unit 110 compares the previously-transmitted data and the current data, and thus outputs the index signal and the index control signals MISS, HIT according to the comparison result.

The filter 121 is comprised of AND gates of each bus on the dual-rail bus 200, and each AND gate of the filter 121 is arranged to receive the index control signal. That is, the AND gates output the result of AND operation for a signal inputted from the dual-rail bus and the index control signal.

On the other side, the filter 121 is comprised of AND gates but it may be embodied differently according to a logical scheme such as an output logic of the transmission data control unit 110.

Moreover, an index transmission unit 122 is comprised of OR gates on the dual-rail bus 200 with a predetermined number (two bits quantity in the embodiment) in a low level among the dual-rail buses. Each OR gate forming the index transmission unit 122 is comprised to receive the index signal. That is, the OR gates transfers a signal transferred from the dual-rail bus 200 or from the transmission data control unit 110.

The index transmission unit 122 is embodied with OR gates in the present invention, but it may differently be embodied according to a logical scheme such as an output logic of the transmission data control unit 110.

The de-compressor 400 is comprised of an output data control unit 410 and a control circuit 420 for performing a decoding operation, and the control circuit 420 is comprised of an index filter 421 and a data combination circuit 422.

The dual-rail bus 200 passing through the de-compressor 400 is branched off and then connected with the output data control unit 410 to input data to transfer. The output data control unit 410 stores the previously-transmitted data. When the index control signals MISS, HIT in a logical "1" state are inputted, the output data control unit 410 provides the stored previously-transmitted data to the data combination circuit 422 with reference to the index signal.

The dual-rail bus 200 of a predetermined number (two bits quantity in this embodiment) in a low level among the dual-rail buses 200 is comprised of the index filter 421 formed with AND gates. Each AND gate forming the index filter 421 is comprised to receive the index signal. That is, the AND gates filters a data transmission transferred from the dual-rail bus 200. The AND gates may be embodied with other logical gates with reference to a logical scheme.

Additionally, the data combination circuit 422 is comprised of OR gates of each bus on the dual-rail bus 200, and each OR gate forming the data combination circuit 422 is arranged to receive the previously-transmitted data outputted from the output data control unit 410.

That is, the OR gates output either a signal inputted from the dual-rail bus 200 or the previously-transmitted data outputted from the output data control unit 410. On the other hand, the OR gates may be embodied with other logical gates with reference to a logical scheme.

With reference to the aforementioned, buffers included in the transmission data control unit 110 and the output data control unit 410 can be embodied in a type such as FIFO, LRU and SWAP to store and output the previous data.

Following illustration is to describe an operation of an embodiment according to the present invention constructed as described above. It will be assumed to store four data in the embodiment.

First of all, when data is transferred from the transmission unit 20 to the data transceiving unit 10, the data is applied on the dual-rail bus 200 of the data transceiving unit 10, and the data is inputted to the transmission data control unit 110.

At this stage, the previously-transmitted data is supposed to be stored in the transmission data control unit 110 already. When the data applied to the dual-rail bus 200 is already stored in one of entries of the transmission data control unit 110, the transmission data control unit 110 outputs the control signal HIT with "1" and the control signal MISS with "0". That is, it outputs a logical "1" state of control signal. While this, the transmission data control unit 110 outputs an index information of the referred entry through two logical signal lines.

At the moment, the filter 121 filters a signal transmission in the dual-rail bus 200 because the MISS of the index control signals is "0". That is, when an identical data is repeatedly transferred, the filter 121 blocks data transmission in all the dual-rail buses.

Furthermore, the index transmission unit 122 constructed at the rear part of the filter 121 transfers a normal data signal transferred from the dual-rail bus or the index signal transferred from the transmission data control unit 110. When the identical data is repeatedly transferred, as aforementioned, there is not a signal transferred from the dual-rail bus. As a result of this, the index transmission unit 122 transfers the index signal outputted from the transmission data control unit 110.

As described above, the dual-rail bus 200 has the same scheme as the conventional asynchronous dual-rail bus. However, on the dual-rail bus according to the present invention, a real signal transition state is differentiated by an operation of the embodiment, in response to the cases of transferring data and transferring an index. That is, the rest of the dual-rail buses except the limited dual-rail bus used for transferring the index signal is used only for transferring the normal data signal.

An index signal line 300 is used to transfer the index signal for determining whether data is transferred or an index data is transferred on the dual-rail bus. If the original data is transferred on the dual-rail bus, the index signal transfers a logical "0" signal, namely, a signal that the MISS signal line is "1" and the HIT signal line is "0". When the identical data is repeatedly transferred, the index signal transfers a logical "1" signal, namely, a signal that the MISS signal line is "0" and the HIT signal line is "1".

When the index signal transfers a logical "0" signal, namely, a signal that the MISS signal line is "1" and the HIT signal line is "0", the de-compressor 400 disables an output of the output data control unit 410, and outputs the normal data transferred through the dual-rail bus 200 as it is.

Conversely, when the index signal is a logical "1" signal, namely, a signal that the MISS signal line is "0" and the HIT signal line is "1", the de-compressor 400 deems that the identical data is repeatedly transferred. As a result, the de-compressor 400 outputs the previous data which is already stored in the output data control unit 410 with reference to the received index signal, and the data combination circuit 422 outputs the data from the output data control unit 410.

As aforementioned, a data transition state of the dual-rail bus 200 varies with the cases of transferring an identical data repeatedly or transferring a normal data, of which will be described with reference to FIG. 5 as follows.

Figure 5:
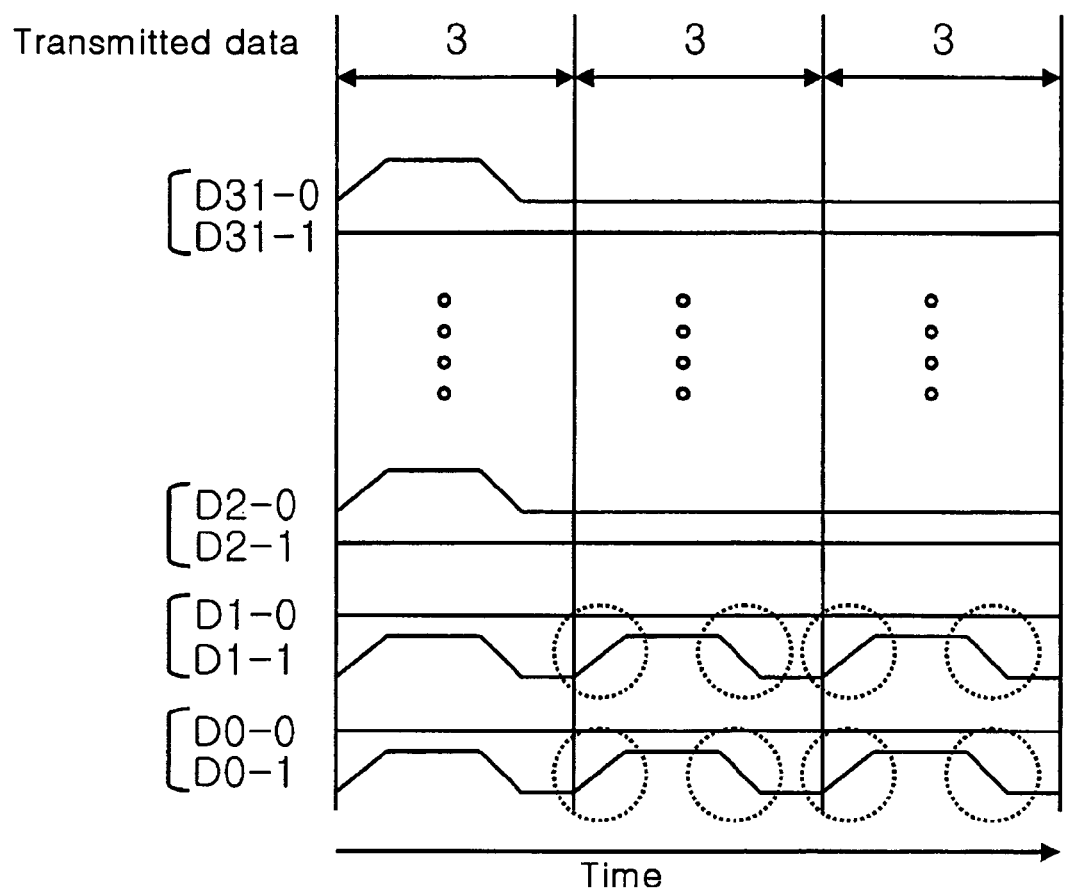
FIG. 5 is a timing diagram illustrating a signal transition state in the case that an identical data is repeatedly transferred in accordance with an embodiment of the present invention.

FIG. 5 is a timing diagram illustrating a signal transition state in case of transferring an identical data repeatedly in accordance with the present invention.

The transmission data control unit 110 on the transmission side doesn't have a previously stored data for data "3" to be transferred at first. Therefore, the compressor 100 and the de-compressor 400 store the data "3" which is to be transferred at first in dual-rail buffers of data control units 110, 410, respectively, and also output the data "3" through the dual-rail bus 200.

Then, when the next data is "3" as same as the previously-transmitted data, the operation provided by the embodiment in accordance with the present invention is performed. In response to the operation, the signal transition state such as in FIG. 5 is generated.

That is, when data "3" is transferred as the second transmission data, the transmission data control unit 110 of the compressor 100 determines whether the previously-transmitted data and the currently-transmitted are identical each other.

As "3" turns out to be identical data, a logical "1" signal, namely, a signal that the HIT signal line is "1" and the MISS signal line is "0" is outputted as an index control signal in response to the decision result. And the index signal which can cause output value "3" is transferred to the de-compressor 400 through two of the dual-rail buses 200.

After completing above operation, the index filter 421 of the de-compressor 400 prevents the index signal received through the dual-rail bus 200 from being transferred to the rear part. That is, as the index filter 421 is comprised of AND gates, when a value transferred through the MISS signal line is "0", the index filter 421 disables an output. Accordingly, when the identical data is repeatedly transferred, all the normal data inputted to the data combination circuit 422 of the de-compressor 400 is filtered.

Moreover, the output data control unit 410 deems that the identical data is repeatedly transferred because the index control signals MISS, HIT are logical "1" states, and also outputs the data "3" of the corresponding entry already stored in the buffer after being previously-transferred to the data combination circuit 422, with reference to the received index signal (transferred with a value corresponding to "3" in the embodiment).

Then, because the identical data the previously-transferred data is stored in the output data control unit 410, the output data control unit 410 outputs the data as an output value, which is already stored in the corresponding entry, according to the index data transferred through the two lower logical signal lines. The data combination circuit 422 outputs the data "3" outputted from the output data control unit 410.

As shown in the operation of the embodiments in accordance with the present invention, when the identical data is repeatedly transferred, the index data is transferred through the dual-rail bus 200 corresponding to the lower limited two bits among the whole dual-rail buses 200.

Accordingly, when the identical data is repeatedly transferred, a signal transition does not occur on the dual-rail bus 200 which does not carry the index signal. That is, during repeatedly-transferring the identical data as shown in FIG. 5, the signal transition is generated on the dual-rail buses D0-0, D0-1, D1-0, D1-1, and not on the rest of the dual-rail buses.

As described above, according to the data transmission apparatus using the asynchronous dual-rail bus of the present invention and a method therefor, when the transmission side transfers an identical data in sequence, the number of dual-rail buses transferring data is limited. It is also possible to reduce a switching operation for transferring a signal by transferring an index data (approximately 75% in maximum). In response to this, it is possible to reduce power consumption (approximately 25% to 30% in maximum).

What is claimed is:

1. A data transmission apparatus using a number of asynchronous dual-rail buses comprising:
   a compressor constructed on a transmission side of the number of asynchronous dual-rail buses for outputting an index signal and an index control signal when identical data is to be transferred, the compressor having a transmission data control unit for storing previously-transmitted data and comparing the previously-transmitted data with data to be currently-transmitted to determine if the previously-transmitted data and the data to be currently-transmitted are identical; and
   a de-compressor constructed on the receiving side of the number of asynchronous dual-rail buses for outputting previously-transmitted data stored in an output data control unit when the index signal and the index control signal are transferred from the compressor, the output data control unit storing the previously-transmitted data, wherein the compressor limits the number of asynchronous dual-rail buses to a predetermined number when identical data is to be transferred.

2. The data transmission apparatus of claim 1, wherein the index signal outputted from the transmission data control unit is transferred to the output data control unit through the limited predetermined number of asynchronous dual-rail buses.

3. The data transmission apparatus of claim 1, wherein the compressor comprises:

the transmission data control unit for storing the previously-transmitted data, comparing the previously-transmitted data with the data to be currently-transmitted, and outputting the index signal and the index control signal when identical data is to be transferred;

a filter for filtering data transmission through the number of asynchronous dual-rail buses according to the index control signal from the transmission data control unit; and an index transmission unit for transferring the index signal outputted from the transmission data control unit to the de-compressor through the limited predetermined number of asynchronous dual-rail buses.

4. The data transmission apparatus of claim 3, wherein the filter is comprised of a plurality of AND gates corresponding to the number of asynchronous dual-rail buses.

5. The data transmission apparatus of claim 3, wherein the index transmission unit is comprised of a plurality of OR gates corresponding to the limited predetermined number of asynchronous dual-rail buses.

6. The data transmission apparatus of claim 1, wherein the de-compressor comprises:

the output data control unit for storing the previously-transmitted data, outputting the previously-transmitted data according to the index control signal when identical data is transferred;

an index filter for filtering the transmission of the index signal when the index control signal is transferred from the compressor when identical data is transferred; and a data combination circuit for combining data outputted from the output data control unit and signals transferred on the number of asynchronous dual-rail buses and outputting the combination.

7. The data transmission apparatus of claim 6, wherein the index filter is comprised of a plurality of AND gates corresponding to the limited predetermined number of asynchronous dual-rail buses.

8. The data transmission apparatus of claim 6, wherein the data combination circuit is comprised of a plurality of OR gates corresponding to the number of asynchronous dual-rail buses.

9. The data transmission apparatus of claim 1, wherein the transmission data control unit and the output data control unit are connected by an index signal line transferring the index signal for classifying transmission.

10. A method for transferring data using a number of asynchronous dual-rail buses, the buses comprising a compressor constructed on a transmission side of the number of asynchronous dual-rail buses including a transmission data control unit for storing a previously-transmitted data, and a de-compressor constructed on a receiving side of the number of asynchronous dual-rail buses for receiving data including an output data control unit for storing the previously-transmitted data, wherein a procedure of transferring data in the compressor comprises:

a first step of storing a currently-transmitted data and comparing the currently-transmitted data with the previously-transmitted data by the data control unit;

a second step of generating a corresponding index signal and index control signal by the data control unit if the previously-transmitted data and the currently-transmitted data are identical;

a third step of filtering the current data to be transferred through the number of asynchronous dual-rail buses in response to the index control signal; and a fourth step of transferring the index signal and the index control signal to the de-compressor, wherein a procedure of transferring data in the de-compressor comprises:

a fifth step of storing data in the output data control unit with reference to the index signal, and outputting the data stored in the output data control unit when the index control signal corresponds to identical data;

a sixth step of filtering a reception of the index signal according to the index control signal when the index control signal corresponds to identical data; and a seventh step of combining the output data of the output data control unit and data transferred from the compressor and outputting the combination.

11. The method for transferring data using the number of asynchronous dual-rail buses of claim 10, wherein in the fourth step, the compressor transfers the index signal to the de-compressor through a limited predetermined number of asynchronous dual-rail buses.

12. The method for transferring data using the number of asynchronous dual-rail buses of claim 10, wherein the seventh step is completed by a plurality of OR gates corresponding to the number of asynchronous dual-rail buses.

* * * * *